May 29, 1956  K. KRISCH  2,748,331
MAGNETRONIC SERVO AND CONVERTER SYSTEM AND APPARATUS
Filed July 30, 1951  3 Sheets-Sheet 1
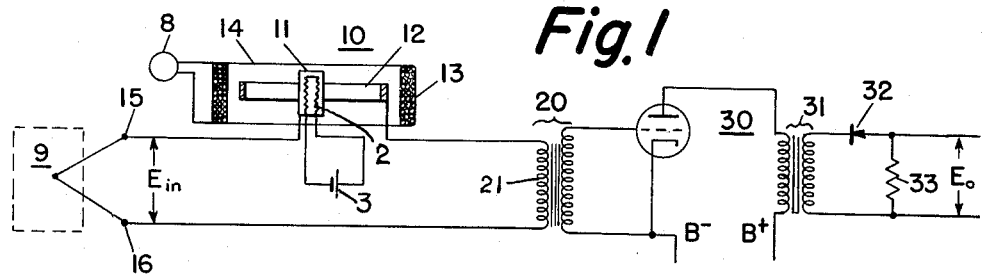
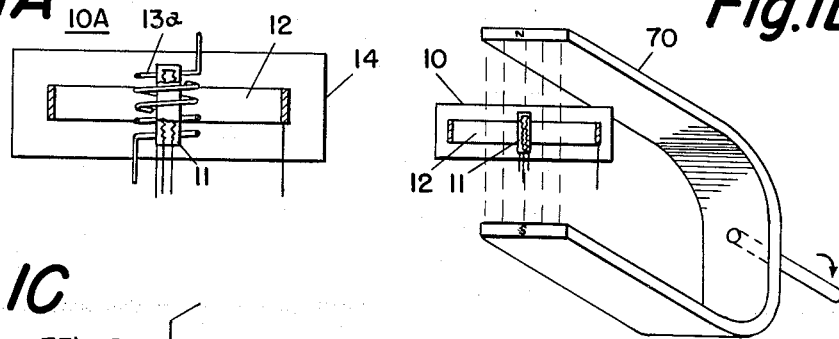
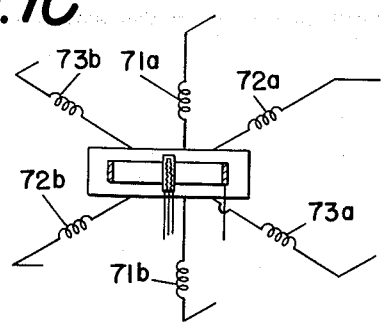
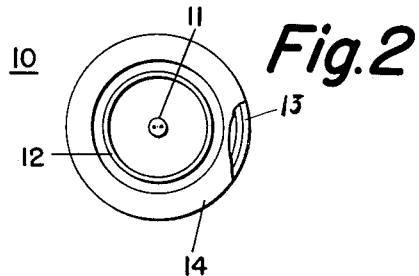
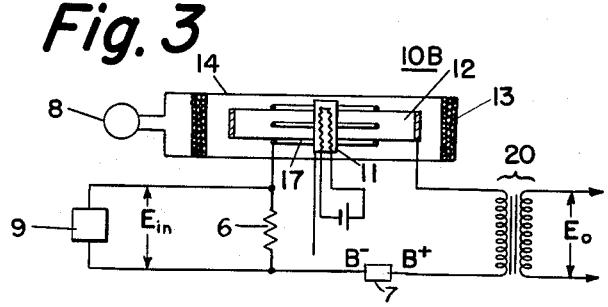
*INVENTOR.*
KUBE KRISCH
BY
*Woodcock and Phelan*
ATTORNEYS May 29, 1956 K. KRISCH 2,748,331
MAGNETRONIC SERVO AND CONVERTER SYSTEM AND APPARATUS
Filed July 30, 1951 3 Sheets-Sheet 2

INVENTOR.
KUBE KRISCH
BY
Woodcock and Phelan
ATTORNEYS

May 29, 1956　　　　K. KRISCH　　　　2,748,331
MAGNETRONIC SERVO AND CONVERTER SYSTEM AND APPARATUS
Filed July 30, 1951　　　　　　　　　　　3 Sheets-Sheet 3
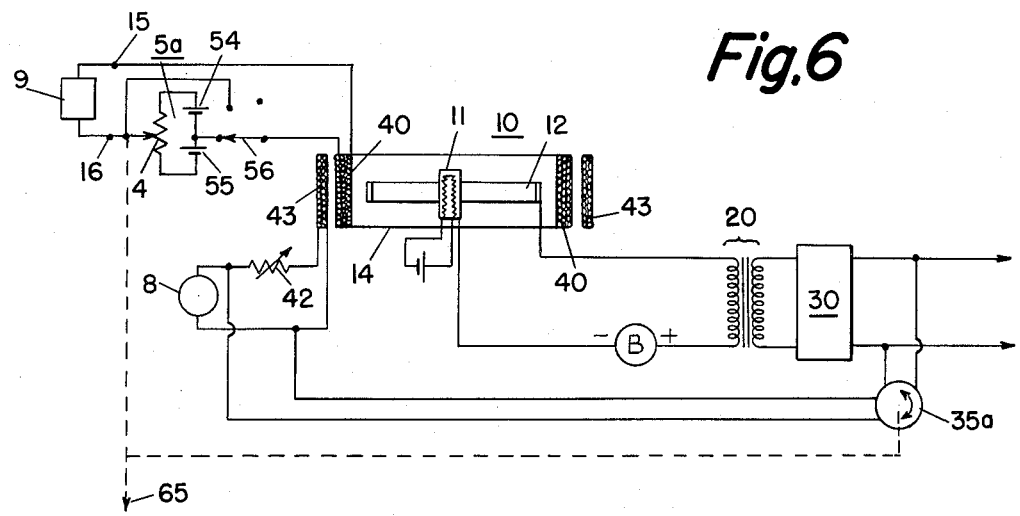
*Fig.6*
*Fig.7*　　*Fig.7B*　*Fig.7D*　*Fig.7F*
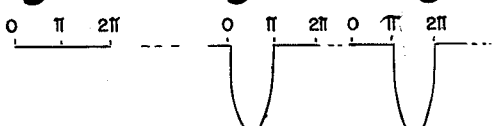
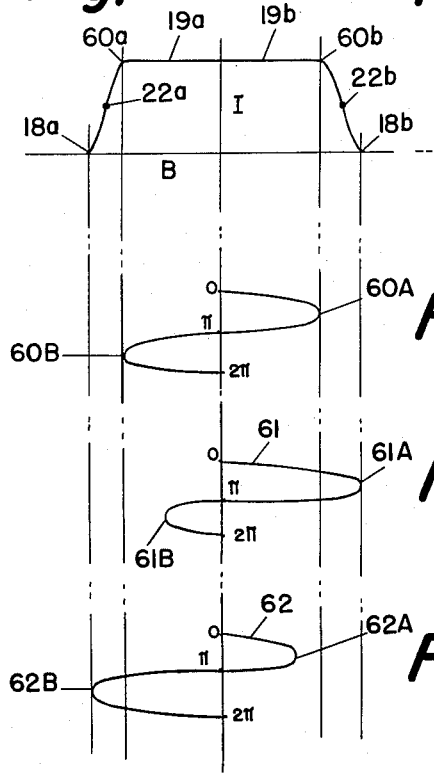
*Fig.7A*
*Fig.7C*
*Fig.7E*
INVENTOR.
KUBE KRISCH
BY
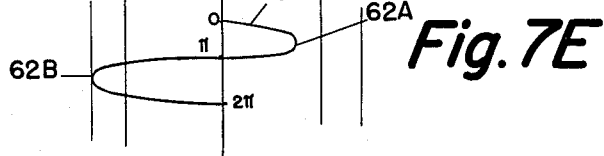
ATTORNEYS United States Patent Office 2,748,331
Patented May 29, 1956

2,748,331

MAGNETRONIC SERVO AND CONVERTER SYSTEM AND APPARATUS

Kube Krisch, Philadelphia, Pa.

Application July 30, 1951, Serial No. 239,295

12 Claims. (Cl. 318—28)

This invention relates to the measurement of weak electrical signals and particularly concerns systems in which direct-current signals or very low frequency alternating-current signals are converted to a frequency which may satisfactorily be amplified by a conventional audio-frequency amplifier.

In the measurement of slowly varying direct-current signals, the use of conventional D. C. (direct-current) amplifiers has been unsatisfactory because their zero-drift masks the changes in signal level. It has become the practice in measurement of such signals and also in measurement of very low frequency A. C. (alternating-current) signals to employ mechanically operated choppers or vibrators to convert them to an A. C. signal of frequency suited for amplification by conventional, stable A. C. amplifiers. However, mechanical choppers or vibrators are ill-suited for such purpose: inter alia, wear, sticking or fouling of their contacts introduces spurious changes of signal level and their mechanical vibration is productive of microphonic effects erroneously interpreted by the amplifier as signals; moreover such vibrators malfunction when subjected to vibration or mechanical shock.

In accordance with the present invention, a signal of the aforesaid character is converted into an output signal of readily amplifiable frequency by periodically varying the plate-cathode conductance of a magnetron about the critical value of its electrode voltage/magnetic-field characteristics.

In some forms of the invention, the input signal is applied between electrodes of the magnetron and the chopping is effected by periodically sweeping the intensity of the axial magnetic field of the magnetron through its critical value: in other forms of the invention, the input signal is applied to vary the intensity of the axial magnetic field and the chopping frequency is applied to vary the potential difference between electrodes of the magnetron; in still other forms of the invention, both the input signal and the chopping frequency are applied to vary the intensity of the axial magnetic field.

More particularly, in those modifications in which the axial magnetic field is varied at chopping frequency, such variation may be obtained by A. C. excitation of a coil or coils producing at least a substantial part of the axial field or by rotation of a magnetic field of constant intensity with respect to the axis of the magnetron.

Further and in accordance with some forms of the invention, there is provided a dual magnetron arrangement in which two sets of magnetron electrodes, in the same or different envelopes, are subjected to the same axial field and are connected with opposing polarities so to convert input signals of either polarity into an A. C. output signal of chopping frequency.

The invention further resides in magnetronic converter devices and systems having features of novelty and utility hereinafter described and claimed.

For a more detailed understanding of the invention and for illustration of various embodiments thereof, reference is made to the accompanying drawings in which:

Fig. 1 schematically illustrates a measuring system using one form of magnetronic chopper;

Figs. 1A, 1B and 1C illustrate other forms of magnetronic choppers utilizable in systems exemplified by Fig. 1;

Fig. 2 is a plan view of the magnetronic chopper of Fig. 1;

Figure 4A:
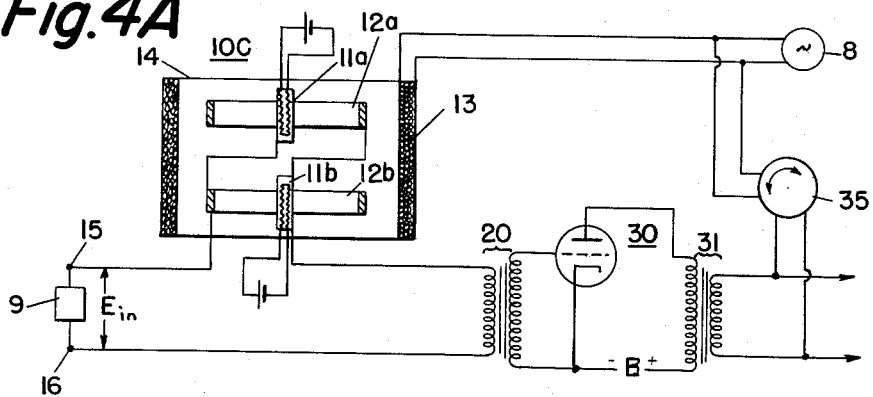
Figure 4B:
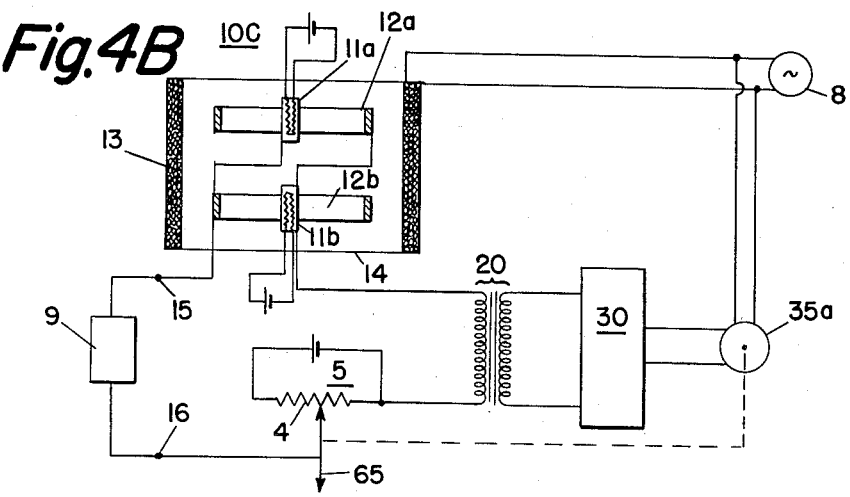

Figs. 3 to 6 schematically illustrate several different types of measuring systems utilizing various magnetronic chopping arrangements; and Figs. 7–7F are explanatory figures referred to in discussion of preceding figures.

In Fig. 1 is shown one arrangement utilizing a magnetron 10 for measurement of a slowly varying direct-current voltage $E_{in}$, representative of a condition magnitude, as produced for example by an electroencephalograph, an electrocardiograph, a salinity or pH cell, a photocell or other source 9 exemplified by the thermocouple shown. Such slowly varying D. C. signals present a difficult problem in amplification because conventional A. C. amplifiers do not respond to very low frequencies and because even well-designed D. C. amplifiers have drift rates often higher than the slow signal changes to be measured: for example, in measurement of start temperature or luminosity, the rate of change of the star signal may be exceeded by the drift rate of a D. C. amplifier yet be below the response band of an A. C. amplifier.

For magnetronic conversion of such slowly changing D. C. signals to frequency that can be further amplified by a conventional A. C. amplifier 30, the D. C. signal source 9 is included in the anode-cathode circuit of magnetron 10 in series with the input coupling impedance, exemplified by transformer 20, of the amplifier. When the anode-cathode circuit includes no source of anode potential other than the D. C. signal source 9, its positive terminal 16, as in Fig. 1, should be connected to the cylindrical anode 12 of the magnetron 10 and its negative terminal 15 should be connected to cathode 11 of the magnetron. The primary winding 21 of transformer 20 may be connected in the cathode lead, or in the anode lead as shown in Fig. 1. The cathode is heated to electron-emissive temperature by current supplied to heater 2 from a suitable source exemplified by battery 3.

For producing in the space between the concentric cathode 11 and anode 12 of the magnetron, an axial magnetic field of cyclically varying intensity and polarity there may be provided, as in Fig. 1, a coil 13 wound on or disposed about the envelope 14 of the magnetron and energized from an A. C. source 8, such as a 60-cycle line or an audio-frequency signal generator. Alternatively, the axial field alternating or fluctuating at a suitable frequency F may be produced by internal coil 13a, Fig. 1A, encircling the cathode 11 of the magnetron 10A and energized from source 8: or, as shown in Fig. 1B, the alternating axial field may be produced by rotating a magnet 70 about an axis so disposed that the field between its pole pieces passes through a position of axial alignment with the magnetron twice per revolution at frequency F; or as shown in Fig. 1C, a rotating magnetic field which periodically passes through positions of axial alignment with the magnetron may be produced by a group of fixed coils 71a—73b angularly positioned about the magnetron and energized from a multiphase source.

Each of these arrangements and equivalents thereof provides an axial magnetic field in the interelectrode space of the magnetron whose intensity periodically varies at a readily amplifiable frequency F. The energizing current (Figs. 1, 1A, 1C) or the strength of the magnet (Fig. 1B) is so selected or adjusted that the intensity of the fluctuating axial field sweeps through the critical field value, below discussed, during each cycle. These arrangements for producing a periodically varying magnetic field may be used in Fig. 1 and other magnetronic choppers subsequently described herein. The variation of input signal, as hereinafter explained, will cause the output current from the magnetron to be in a form of a series of substantially rectangular pulses of fixed frequency F and of variable duration and spacing. Thus, for example, as the input signal increases, the magnetron will conduct during increasing fractions of each cycle. This output signal, which as hereinafter explained also varies in magnitude, is representative of the magnitude of the input signal.

When an axial magnetic field is applied to a magnetron, electrons leaving the cathode 11 and tending to move radially toward the anode 12 will be deflected by the field for movement in a curved path at right angles to the magnetic field and to their radial movement, the radius of curvature being a function of the interelectrode potentials and the intensity of the magnetic field. When the curvature is such that electrons do not reach the anode, the "critical" point exists and the magnetron current I is "cut-off" as shown for example by point 18a, Fig. 7, of curve 19a. Thus the magnetron is non-oscillatory and the application of an axial magnetic field whose intensity periodically passes through critical value results in chopping or periodic interruption of the current from the D. C. signal source 9 at a frequency F corresponding with that of the field and suited for further amplification by a conventional A. C. amplifier exemplified by the single stage audio-frequency amplifier 30. The input coupling impedance of the amplifier is preferably a step-up transformer 20 itself providing voltage gain of the signal: the output of the amplifier may be applied, preferably through an impedance-matching transformer 31, to a rectifier 32 and an indicating, recording or control device, exemplified by load resistor 33, utilizing D. C. voltage $E_0$ as an amplified reproduction of the D. C. input signal voltage $E_{in}$ of the magnetron.

There is thus provided a system for detecting, amplifying and utilizing, for measurement or control, weak and slowly varying D. C. signals which is free of drift errors, which is not subject to burn-out or failure of vibrators and which is quiet in operation. The same arrangement, without modification, is suited for weak A. C. signals whose frequency is low compared to the field-exciting frequency of source 8: the positive half-waves of the slowly varying signal current are magnetronically chopped to provide an A. C. signal of frequency F whose amplitude varies with the input signal amplitude. In modifications subsequently described, both the positive and the negative half-waves of the slowly varying A. C. input signal are converted magnetronically to an output signal of frequency corresponding with chopping frequency F and of magnitude corresponding with the magnitude of the input signal.

In the modification shown in Fig. 3, the input signal $E_{in}$ is applied between grid 17 and cathode 11 of magnetron 10B and a source 7 of D. C. plate voltage $E_b$ is connected between cathode 11 and anode 12 in series with the load or output impedance exemplified by transformer 20. The axial magnetic field of the magnetron may be periodically swept through its critical frequency by any of the arrangements of Figs. 1–1C: specifically, as shown in Figs. 1 and 3, the alternating magnetic field may be produced by coil 13 disposed about the magnetron and excited from an A. C. source 8 of suitable frequency F. The magnitude of the anode current that is periodically interrupted or chopped is determined in part by, or dependent upon, the signal voltage $E_{in}$ on grid 17 and consequently the interrupted anode current of the magnetron has an A. C. component of frequency F whose amplitude corresponds with or is representative of the amplitude of the input signal $E_{in}$. With the signal applied to the magnetron grid, the input circuit will not cause excessive loading even when signal source 9 is of high impedance. The high-resistance grid-leak 6 may be omitted when source 9 itself provides a direct-current path from grid to cathode.

By way of specific example, coil 13 of Fig. 3 may be considered as a concentrated coil whose axial flux density in the center of anode-cathode region is (1) $$B = \frac{M_0 N I}{2R}$$

where:

$B$ = flux density (webers/sq. meter)
$N$ = number of coil turns
$I$ = coil current (amperes)
$R$ = coil radius (meters)
$M_0$ = core permeability The magnetic flux distribution across the plane of the coil and within the inner circumference is lowest at the center and rises slowly toward the coil: at about 80% of this radial distance, the intensity is higher by a factor of about 2 which distribution is suited for operation of the magnetron as above described. The relation between interelectrode voltages and the magnetic field may be expressed (in gaussian units) by (2) $$V_{pe} = \frac{V_p^2 B_z^2}{45.48}\left(1 - \frac{V_c^2}{V_p^2}\right)$$

where:

$V_c$ = cathode radius (cm.)
$V_p$ = anode radius (cm.)
$V_{pc}$ = anode-cathode voltage (volts)
$B_z$ = magnetic flux (gauss)

Assuming by way of example, that the values of $V_c$, $V_p$, $V_{pc}$ are respectively 0.5, 3 and 100, a field intensity ($B_z$) of 23 gauss will provide cut-off. Such field can be obtained by using a coil 13 which is about 2 centimeters long and 2 centimeters thick, having a radius of 4 centimeters and comprising about 1000 turns of #24 wire energized by a current of about 150 milliamperes (A. C.): when as in Fig. 1, the anode-cathode voltage may be only the small D. C. input signal, a smaller exciting current will suffice for the same coil and magnetron parameters.

The A. C. signal in the output circuit of magnetron 10B, Fig. 3, may be further amplified, by impression upon the input circuit of an amplifier 30, as in Fig. 1, through transformer 20 or equivalent coupling impedance or network, when necessary for measurement or control purposes.

When it is desired to measure D. C. signals whose polarity may vary on both sides of zero during a measuring run, or when both half-cycles of a low-frequency alternating current are to be measured, the dual magnetron arrangement 10C of Fig. 4A may be used to chop or periodically interrupt signals of each polarity from source $E_{in}$. The dual magnetron 10C comprises two sets of concentric anode-cathode electrodes, in the same or different envelopes, disposed in axial alignment. The anode of each set of electrodes is directly conductively connected to the cathode of the other set so that the anode-cathode paths internally of the magnetron are in parallel with one another. When the upper input terminal 15 is negative, electron flow will be from cathode 11a to plate 12a: when terminal 15 is positive, electron flow will be from cathode 11b to plate 12b. Thus with this dual arrangement, either poling of a D. C. signal source 9 provides an A. C. output signal. When source 9 provides a low-frequency alternating signal current, the successive half-cycles of current will flow in the same manner as above described for oppositely polarized D. C. signals to provide an A. C. output signal of higher frequency F suited for further amplification.

Coil 13, excited by alternating current of frequency F, may be used to develop a magnetic field exceeding the critical magnetic field value of each of both magnetron units momentarily during each half-cycle of such current. The current field characteristic of the dual arrangement is shown by the combined curve 19a, 19b of Fig. 7 in which the points 18a, 18b are the cut-off points. This action converts the input signal current into an alternating signal of double frequency F which can be amplified readily in amplifier 30. The phase of this A. C. signal with respect to the excitation of coil 13 will be determined by the polarity of the signal $E_{in}$ from source 9.

The signal frequency output of amplifier 30 may be connected to any suitable measuring, indicating, or recording device which preferably is phase-sensitive. By way of example, the device 35 (Fig. 4A) may be a reversible A. C. motor such as a two-phase motor, one of whose windings receives current from the same source as coil 13 and another of whose windings is excited from the output signal of amplifier 30. These currents will produce a deflection or rotation of the shaft of motor 35 in a direction determined by the phasing of the currents thereto. As the polarity of phasing of source $E_{in}$ reverses in sign, rotation or deflection of motor 35 reverses. For measuring or recording purposes, device 35 may be a torque motor such as an A. C. galvanometer: for control purposes, it may be a torque motor or its rotor may be unbiased.

For potentiometric measurements of a D. C. signal, the arrangement of Fig. 4A may be modified, as in Fig. 4B, by inclusion of a potentiometer network 5 in circuit with source 9 and magnetron 10C. When the voltage of source $E_{in}$ is not balanced by the effective voltage of potentiometer 5, the voltage difference will cause a current to flow through magnetron structure 10C and transformer 20, in a direction dependent upon the sense of the unbalance. By the above-described periodic sweeping through the critical field value of the magnetron, this current is chopped into alternating current synchronously related to frequency F, and applied in amplified magnitude to one winding of reversible motor 35a. The phase of this current relative to that supplied to another winding of motor 35a causes the motor to rotate in proper direction to restore balance by its adjustment of the potentiometer slidewire 4.

Figure 5:
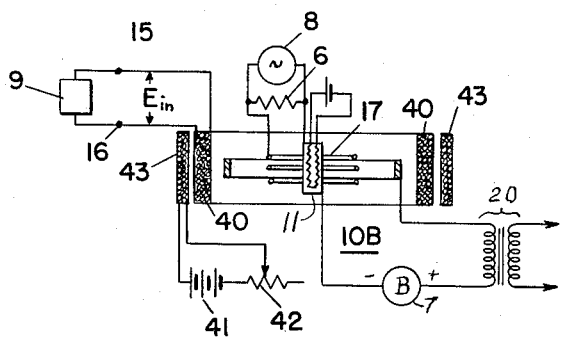

In the modification shown in Fig. 5, the relation between interelectrode voltages and axial magnetic field is varied by applying the signal voltage $E_{in}$ to a magnetron field coil 40. Current from a D. C. source, exemplified by battery 41 is applied to a second magnetron field coil 43. Both coil 40 and coil 43 are wound around magnetron 10B in the same manner as coil 13 of preceding modifications. The chopping alternating voltage of frequency F is applied between grid 17 and cathode 11 to cut off the magnetron conduction during each half-cycle of this voltage, so momentarily interrupting any current through the tube and producing a readily amplifiable A. C. representative of the input signal $E_{in}$.

With no current in coil 40 and with no chopping voltage applied to grid 17, current through coil 43 may be adjusted, as by resistor 42, to a value for which the plate current of magnetron 10A is about half its maximum value such as point 22a of curve 19a, Fig. 7. If source $E_{in}$ produces a current in coil 40 whose magnetic field adds to that of coil 43, the anode current of magnetron 10B will be decreased an amount representative of the current from $E_{in}$: conversely, if the current from source $E_{in}$ produces a field opposing that from coil 43, the current of magnetron 10A will be increased an amount representative of the current from $E_{in}$. Application of the chopping voltage to grid 17 will convert these currents into an A. C. signal which can be amplified and whose variations from a mid-range value is representative of the current from source $E_{in}$.

An alternate operating condition for Fig. 5 is to adjust the current through coil 43 so that for zero input signal magnetron 10A is just at cut-off (point 18a of Fig. 7) for the chopping voltage applied to grid 17. Source $E_{in}$ is connected with polarity which causes its current through coil 40 to produce a field opposing that of coil 43. As the current from $E_{in}$ increases, magnetron 10A will conduct during increasing fractions of each cycle of the chopping voltage and will pass correspondingly larger currents. This A. C. signal will be representative of the magnitude of the current from $E_{in}$.

As shown in Fig. 6, the chopping voltage of frequency F can be applied to vary the interelectrode-voltage/magnetic-field relation of magnetron 10 by application to field coil 43 surrounding the magnetron. The voltage $E_{in}$ to be measured is applied to coil 40 which also surrounds the magnetron as in Fig. 5. A source of variable and reversible D. C. voltage, exemplified by network 5a including batteries 54, 55 and slideware 4 is connected to the D. C. source 9 of signal voltage $E_{in}$. Switch 56 is movable to select either a direct application of $E_{in}$ to coil 40, application of $E_{in}$ in series with the variable reversible source of D. C. voltage when a balancing type measurement is to be made, or to select an open circuit test position.

With switch 56 open, resistor 42 is varied to adjust the magnetic field applied to magnetron 10 to an intensity slightly less than that which marks a noticeable reduction in plate current from maximum (points 60a, 60b, Fig. 7). It is the highest magnetic field which can be applied without effecting reduction in plate current through magnetron 10. Under this circumstance, for zero value of the input signal, the field intensity as shown by curves 60A, 60B of Fig. 7A varies within limits 60a, 60b of the magnetron characteristic, Fig. 7, and the anode current, as shown by Fig. 7B, has no A. C. component of the chopping frequency F.

For measurement or indication of $E_{in}$ (non-balancing type of measurement) switch 56 is moved to the position for which $E_{in}$ is applied directly to coil 40. Depending upon the polarity of $E_{in}$, the field produced by its current flowing in coil 40 will add to one half-wave (61A) of the field from coil 43 and subtract from the following half-wave (61B), as illustrated as wave 61, Fig. 7C; or, in the opposite polarity, it will subtract and add respectively to the same successive half-waves, as illustrated by half-waves 62A, 62B of wave 62, Fig. 7E. The half-wave in which the field from coil 40 adds to the field from coil 43 produces a total field sufficient to effect a reduction in plate current. When the field added by coil 40 raises the total field to more than the critical field for magnetron 10, then plate current momentarily is cut off: such cut-off relation is illustrated at 61A and 62B of Figs. 7C and 7E.

It will be noted that the reduction in plate current occurs in the first $(0-\pi)$ half-wave of a full cycle of the chopping wave when the magnetic fields from coils 40 and 43 add in this same or first half-wave (Fig. 7D), and that the reduction occurs in the second $(\pi-2\pi)$ half-wave when the magnetic fields add in this second half-wave (Fig. 7F). Thus, the phase of the current reduction in transformer 20, Fig. 6, will be representative of the polarity of the voltage applied to coil 50; and the degree of reduction toward cut off will be representative of the magnitude of $E_{in}$. In short, the A. C. component of the anode current of the magnetron is of magnitude corresponding with the magnitude of the input signal $E_{in}$ and of phase corresponding with the polarity of the input signal. This alternating current is amplified in amplifier 30 and compared with the excitation of coil 43 in any suitable phase-sensitive measuring or indicating circuit or device 35a, such as an A. C. galvanometer, an oscilloscope, or the like.

When a balancing-type measurement of $E_{in}$ is desired, switch 56 is moved to connect the split-potentiometer network 5a in series with E_in and the field coil 40. With batteries 54 and 55 connected as shown, the movable contact of resistor 4 can be adjusted on either side of its electrical midpoint to select a voltage of either polarity to balance against $E_{in}$.

As above described, the phase of the output current from amplifier 30 reverses with reversal of the polarity of the voltage applied to coil 40. For this position of switch 56, the voltage applied to field coil 40 is the unbalance between $E_{in}$ and the effective voltage of slide-wire 4.

When the current from amplifier 30 is applied to one winding of a two-phase motor 35a and chopping voltage of frequency F is applied to the other winding thereof, the direction of rotation will be opposite for opposite polarities of unbalance voltage applied to coil 40. Consequently the motion of motor 35a may be used to effect prompt rebalancing adjustments of the contact of slidewire 4 of the potentiometer network 5a.

Motor 35a may be utilized to position a recorder pen 65 or other controlled element such as a valve, rheostat, wing tip, diving fin or the like in accordance with the variations in amplitude and polarity of the magnetronically chopped input voltage $E_{in}$. In all of Figs. 3 to 6, the A. C. signal may be rectified, as in Fig. 1, and applied to a direct-current indicating or recording device.

It shall be understood the invention is not limited to the specific arrangements disclosed and that changes and modifications may be made within the scope of the appended claims.

What is claimed is:

1. In a measuring system including a source of a low-level, electrical input signal varying in accordance with changes in magnitude of a condition under measurement, a non-oscillatory magnetron system for producing substantially rectangular unidirectional current pulses of fixed audio-frequency and whose duration and spacing varies in accordance with changes in magnitude of said input signal comprising a magnetron device having concentric electrodes including at least a cylindrical anode and a thermally-emissive cathode with a direct-current potential-difference between them and having field-producing means providing axially of said electrodes a magnetic field which jointly with said potential-difference determines the critical value of the conductance characteristic of said magnetron device, a source of fixed chopping frequency electrically connected to said magnetron device to vary its conductance about said critical value to produce substantially rectangular output current pulses of said fixed audio-frequency, and conductor means for connecting said source of low-level electrical input signal to the magnetron device to vary the fraction of each cycle of said fixed frequency for which the magnetron is conductive and so to vary the duration of said fixed-frequency output-current pulses.

2. An arrangement as in claim 1 in which the magnetron device has two sets of concentric electrodes in axial alignment in said magnetic field, in which the anode of each set of electrodes is directly conductively connected to the cathode of the other set so that the anode-cathode paths internally of said device are directly in parallel with one another, and in which said parallel anode-cathode paths are jointly connected in series with an output device to provide it with unidirectional current output pulses which are of chopping frequency for either poling of a direct-current input signal source and which are of twice chopping-frequency for an alternating-current input signal source.

3. An arrangement as in claim 1 in which the input-signal is introduced in the anode-cathode circuit of the magnetron and in which the chopping frequency varies the intensity of said magnetic field.

4. An arrangement as in claim 1 in which the magnetic field is produced by a stationary coil energized by alternating current of chopping frequency.

5. An arrangement as in claim 1 in which the magnetic field rotates through axial alignment with the magnetron at chopping frequency.

6. An arrangement as in claim 5 in which a rotating permanent magnet provides the rotating magnetic field for the magnetron.

7. An arrangement as in claim 5 in which the rotating magnetic field is produced by coils angularly spaced with respect to the axis of the magnetron and energized from a multiphase source of chopping frequency current.

8. An arrangement as in claim 1 in which the input signal is applied between grid and cathode electrodes of the magnetron and in which the intensity of the magnetic field is varied at chopping frequency.

9. An arrangement as in claim 1 in which the input signal and the chopping frequency excite field coils of the magnetron.

10. An arrangement as in claim 1 in which the magnetron includes a grid to which the chopping frequency is applied and in which the magnetron has field coils respectively energized by the input signal and by direct current of adjustably fixed magnitude.

11. An arrangement as in claim 9 in which the source of a direct-current input signal and the field coil associated therewith are in circuit with a split-potentiometer adjustable to balance the input signal for either polarity thereof.

12. An arrangement as in claim 11 additionally including a reversible alternating-current motor having windings respectively energized by chopping frequency current and an alternating-current signal output from the magnetron.

References Cited in the file of this patent

UNITED STATES PATENTS

| | | |
|---|---|---|
| Re. 21,153 | Hazeltine | July 18, 1939 |
| 1,807,097 | Bodde | May 26, 1931 |
| 2,111,263 | Fritz | Mar. 15, 1938 |
| 2,114,035 | Skellett | Apr. 12, 1938 |
| 2,213,076 | Schunack | Aug. 27, 1940 |
| 2,302,049 | Parker | Nov. 17, 1942 |
| 2,424,933 | Kalmus | July 29, 1947 |
| 2,548,225 | Linder | Apr. 10, 1951 |
| 2,565,410 | Tiley | Aug. 21, 1951 |
| 2,569,924 | Coleman | Oct. 2, 1951 |
| 2,605,428 | Kalmus | July 29, 1952 |
| 2,614,188 | Williams et al. | Oct. 14, 1952 |